Fig. 9
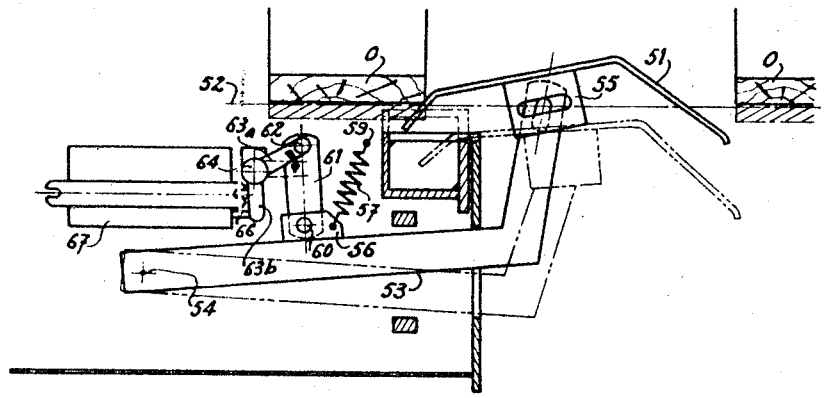
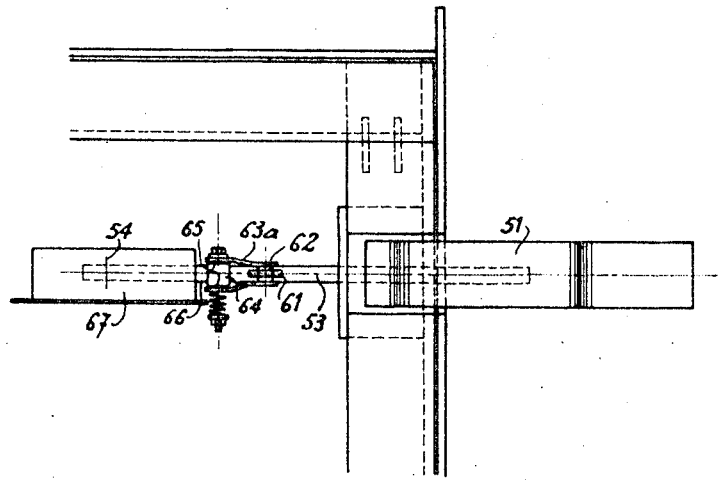
Fig. 10

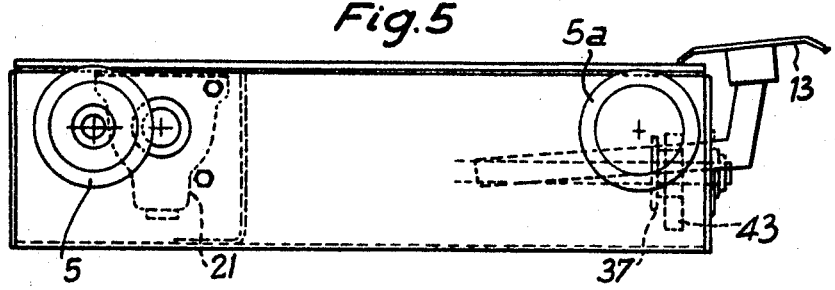
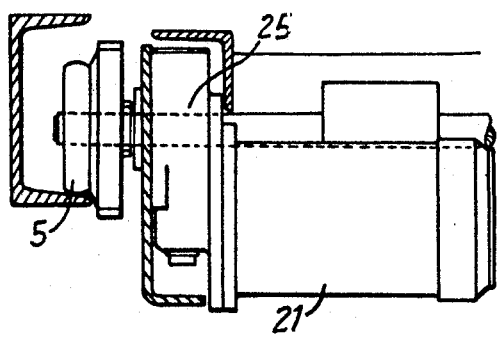
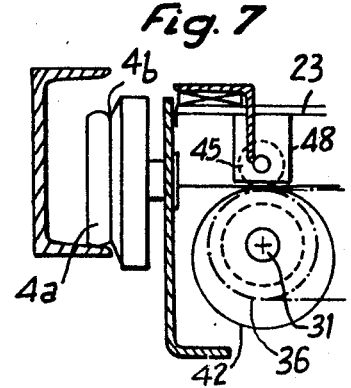

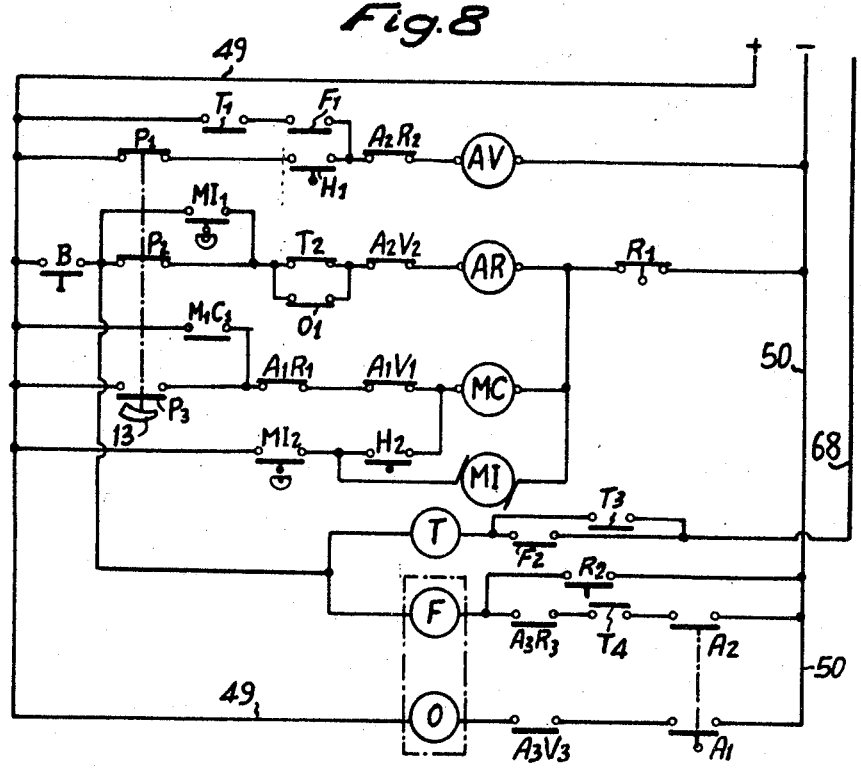

United States Patent Office 3,458,060
Patented July 29, 1969

3,458,060
ELECTRO-MECHANICAL INSTALLATION FOR TRANSFERRING LOADS ALONG A HORIZONTAL PATHWAY
Dominique Mary, Codebec-les-Elbeufs, Eure, and Christian Bussienne, Surville, Eure, France, assignors to Corporation Constructions Mills-K, a limited company
Filed Oct. 16, 1967, Ser. No. 675,679
Claims priority, application France, Nov. 23, 1966, 84,689
Int. Cl. E04h 5/02; B61b 13/00
U.S. Cl. 214—16.4                                        6 Claims

ABSTRACT OF THE DISCLOSURE

This invention relates to live storage systems using a movable carriage which alternately moves in forward and backward directions along a load transfer pathway and has a plate in the raised position of which a load is transported.

Figure 1:
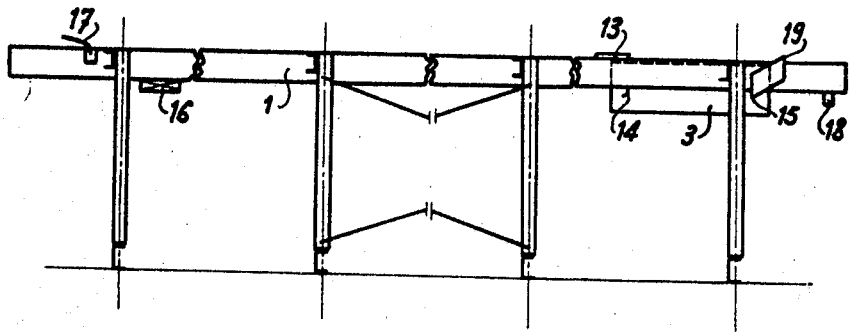

The instant invention more particularly relates to a system of the above character, which is provided with a particularly dependable and versatile electric control circuit.

---

This invention relates to apparatus for transferring loads along a horizontal pathway. The invention is particularly adapted for use in live storage systems, wherein the successive loads are transferred from the entrance of the conveyor pathway towards its exit and, the first load introduced at the entrance having been removed at the exit, a shifting action is effected in the direction of the exit, of all the loads on the pathway.

Live storage systems have been devised, using a movable carriage which is capable of moving alternatively in one direction and in the other, along the pathway said carriage having a plate adapted for taking, in the outward direction of the carriage (i.e. from the entrance towards the exit) a raised position in which it transports the load.

For that purpose, the said systems are provided with an electric circuit involving contacts that are controlled by different detector means placed on the carriage and on the framework of the conveyor line that are capable of collecting binary information relative to ends of front, back, upward and downward strokes of the cariage upon encounter with an obstacle by the carriage on the conveyor line and upon discharge of an object; and motor means controlled by said electric circuit and capable of releasing, as a function of said information, the outward or return movement of the carriage or its stopping in a definite position, and the elevation, lowering or stopping of the plate in the upward or downward position.

Such systems are adapted for automatically performing the operations of loading, unloading and re-arranging the objects, when an object is placed at the entrance of the pathway or unloaded at the exit thereof.

However, it is a different problem to devise a dependable and versatile electric circuit of simple design which is adapted for automatically controlling the various operations to be performed, and this problem has not been solved in a satisfactory manner until now.

Accordingly, it is an object of the present invention to provide, in such a live storage system, a comparatively simple and highly dependable electric circuit which is, however, adapted properly to operate in a variety of circumstances and in particular, in the transportation of pallets of various sizes and shapes and with a number of stocking stations in each pathway which may vary within large limits, including a complete filling up of the pathway, the system being adapted for normally starting back the program after a breakdown in the power supply has occurred or after a carriage has been transferred from one pathway to another.

It is another object of the invention to provide such a live storage system wherein the same carriage is adapted for serving a plurality of stocking pathways.

According to a particular feature of the invention, the detector means comprise a finder placed at the front of the carriage and the electric circuit includes at least three contacts, adapted for cooperation with the finder and control of the horizontal motion of the carriage and the vertical motion of the plate, a first switching of said three contacts taking place at the time when an obstacle is present on the pathway at a predetermined distance from the front of the carriage, whereas another switching takes place when the finder is released, the electric control circuit further comprising means for controlling the forward motion of the carriage independently of the action of the said three contacts, each time an object is unloaded at the exit of the pathway when the carriage is stopped with its plate lowered.

According to another feature of the invention, the electric control circuit comprises a further contact which is switched on each time the carriage is removed from one pathway and a further supply circuit for said means for controlling the forward motion of the carriage, the said further supply circuit being established each time the further contact is switched on.

Yet another feature of the invention consists in the provision of delay means which are adapted for cancelling the action of the said three contacts for a predetermined time interval, when the return movement of the carriage that has first deposited an object occurs.

Figure 2:
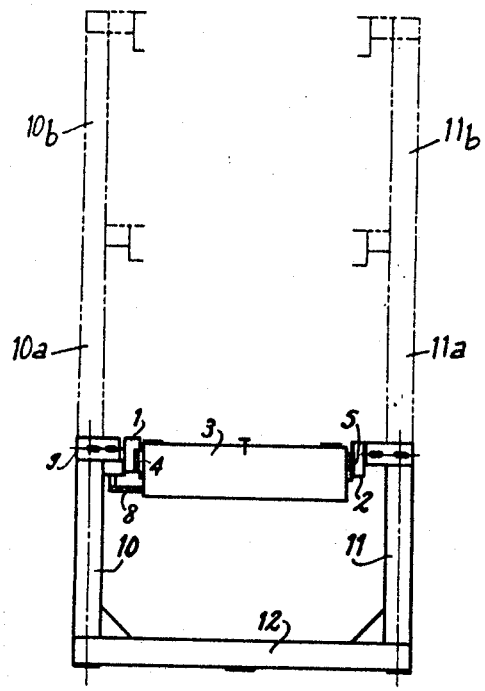
Figure 4:
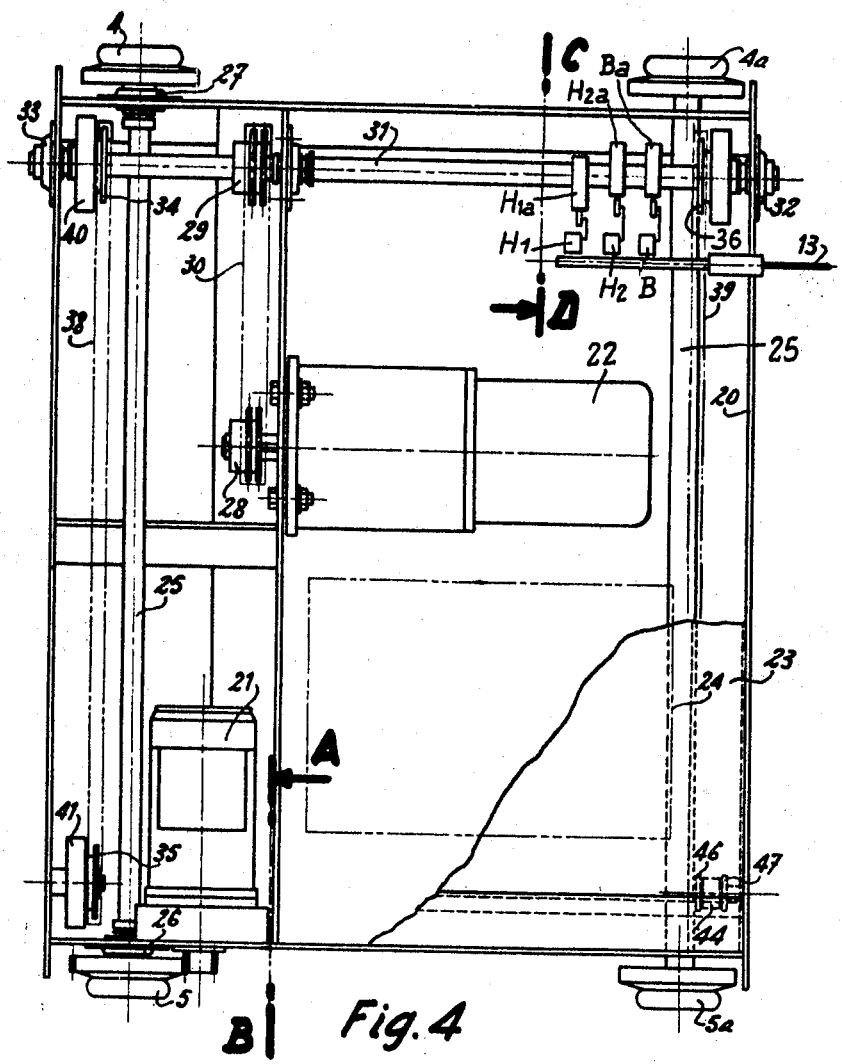
Figure 3:
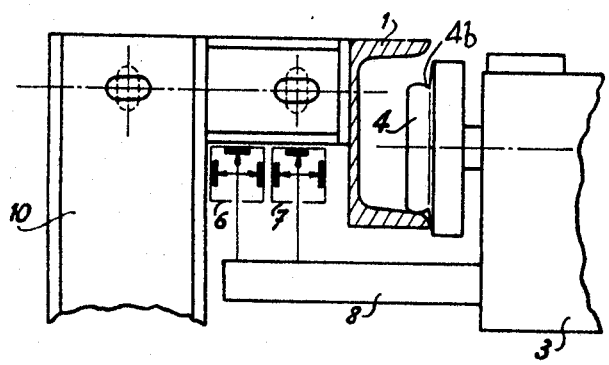

One embodiment of the invention will now be described, by way of example only, reference being made to the accompanying drawings in which:

FIGURE 1 is a fragmentary front elevation of a storage framework according to the invention, FIGURE 2 is an end elevation of such a framework, FIGURE 3 shows on a larger scale a detail of FIGURE 2, FIGURE 4 is a plan view of the carriage that cooperate with the framework, FIGURE 5 is a front elevation of said carriage, FIGURE 6 is a sectional view along A–B of FIGURE 4, FIGURE 7 is a sectional view along C–D of FIGURE 4, FIGURE 8 is the circuit diagram of the transfer control means, FIGURES 9 and 10 are elevational and plan views, respectively, of a preferred embodiment of a detector device that is provided onto the carriage.

Th device for the transfer of loads shown diagrammatically in FIGURES 1 and 2 is essentially constituted by a framework which defines at least one pathway which is preferably horizontal, by means of two parallel rails 1 and 2 on which rolls a movable carriage 3. The wheels, such as 4 and 5, of the latter are driven by electric motor members built into the carriage, as will be seen later, which are fed with electric power from lines 6, 7 fixed onto the framework, by means of sliding contact devices, such as 8. As apparent from FIGURE 3, the wheels are profiled (in 4b) so as to provide lateral guiding of the carriage along the rails.

The material construction of the framework by means of conventional sectional irons such as 9, 10, 11 and 12, constituting side members, posts and cross members as well as that of the electric supply of the carriage, are within the understanding of the skilled man and will not be described in any further detail.

In FIGURE 2, two additional storage channels (10a, 11a and 10b, 11b) superimposed on the lower channels are shown as a dotted line.

It should be pointed out furthermore that carriage 3 is provided in the front with a detector device or finder 13 (FIGURES 1 and 2) and on its lateral side, visible in FIGURE 1, with a contact for forward end stroke 14 and a contact for backward end stroke 15. The framework is provided with (FIGURE 1) a stop for forward end stroke 16, and a contact for switching on forward motion 17 and a safety stop for backward end stroke 18 and a retractable stop for backward end stroke 19.

These different contacts are shown in a purely symbolic way: their material construction is within the understanding of the skilled man and their respective functions will be explained in detail in what is to follow.

In FIGURES 4 and 7, it can be seen that carriage 3 incorporates, mounted into a chassis 20, which is constructed for example, from folded iron plates, a first motor and gear reduction unit 21, whose function it is to control the translation of the carriage and a second motor and gear reduction unit whose function it is to control an upward and downward movement of a plate 23 on which the loads to be transported are to be placed.

Carriage 3 consists in addition, of an electric circuit control of these different movements. This circuit includes, on one hand, components which are symbolized in FIGURE 4 by a rectangle drawn as a mixed dash and dot line 24, and, on the other hand, three switches $H_1$, $H_2$ and B (FIGURE 3). It will be described in detail in what is to follow.

The unit 21 drives driving rollers 4 and 5 that are linked through a shaft 25 supported by two bearing brackets 26 and 27 mounted into the lateral faces of chassis 20. The details of construction of this assembly for the control of the translation of the carriage, which involves in addition two bearer rollers 4a and 5a, linked through a shaft 25a, appear in FIGURES 4, 5 and 6. The said rollers are mounted on two shafts which pass through the chassis. This provides alignment of the wheels and avoids the transmission of a torque of the chassis. The motor in unit 21 is preferably a braking motor for reasons which will be explained in what is to follow.

The unit 22, in turn, consisting of a braking motor, drives through gears such as 28 and 29 and through a double chain 30, a shaft 31 supported by bearing rollers 32 and 33 respectively mounted into the anterior and posterior faces of chassis 20. Shaft 31 in turn drives, either directly or through gears 34 and 36 and through chains 38–39, four cams 40–43. These cams control the upward and downward movement of plate 23 through four bearing rollers such as 44 and 45 (FIGURES 4 and 7), each one mounted between two legs (such as 46–47, FIG. 4 and 48, FIGURE 7) that are integral with said plate.

Shaft 31 further drives directly three cams $H_{1a}$, $H_{2a}$ and Ba, in turn controlling respective contacts $H_1$, $H_2$ and B.

The control electric circuit 24 built into the carriage will now be described, with reference to FIG. 8.

In order to simplify the drawing, it has been supposed that this circuit consists only of fixed elements, its feeding being insured by two wires 49 and 50 respectively connected to + and — minus current potentials and to a further wire 68, the function of which will be explained hereinafter. In reality, as has been explained above, said circuit consists of fixed feeding lines connected to the distribution alternating main and of a mobile part incorporated into the carriage and plugged into said lines by means of sliding contacts. The skilled man will however easily establish the actual circuit from the schematic diagram which is going to be described.

A circle containing the indication "AR" symbolizes the means for provoking "backward" motion of translation motor 21, a circle containing the indication "AV" symbolizes the means for provoking "forward" motion, the forward motion being the one which provokes displacement of the carriage from right to left in FIGURE 1. Circle "MC" symbolizes the starting means for motor 22 which controls the cams, and which can only rotate in one direction. Members "AR", "MC" and "AV" may, in practice, be relays which when fed, provoke the energization of the appropriate motor windings. Relay AV includes, in addition to its energizing coil inserted into the circuit at the place indicated by the letters AV surrounded by a circle, three additional contacts $A_1V_1$, $A_2V_2$ and $A_3V_3$. Similarly, relay AR includes three additional contacts $A_1R_1$, $A_2R_2$ and $A_3R_3$ and relay MC, and additional contact $M_1C_1$.

The electric circuit shown in FIGURE 8 incorporates the different contacts controlled by the detector means that are shown in FIGURE 1, i.e.

$P_1P_2P_3$: these involve the three interlocked contacts controlled by the engagement of finder 13 of the carriage with a surface which provokes its depression. As will be explained in the detail later on, referring to FIGURE 9, these contacts are commutated a first time upon this depression, and a second time when the released finder rises again.

$R_1$: this involves a contact, the opening of which is controlled by engagement of element 15 in FIGURE 1, either with stop 18, or with stop 19.

$A_1A_2$: these involve two interlocked contacts that are controlled by engagement of element 14 in FIGURE 1 with stop 16.

The electric circuit in FIGURE 8 involves in addition:

contact B (FIGURE 3) whose closing is controlled by cam Ba in the low position of plate 23;

contact $H_1$ (FIGURE 3) whose closing is controlled by cam $H_{1a}$ in the high position of plate 23;

contact $H_2$ (FIGURE 3) whose closing is controlled by cam $H_2$ when plate 23 is lowered;

a timing unit MI which after its release keeps two contacts $MI_1$ and $MI_2$ closed for a predetermined time interval;

a contactor T, equipped with four contacts $T_1$–$T_2$–$T_3$–$T_4$;

a contact $R_2$, arranged on the carriage so as to close each time the carriage is removed, at the exit end of the pathway;

a bi-stable unit including two control coils F and O arranged in box 24 (FIGURE 4), and having a first condition (shown in FIGURE 8) wherein contact $O_1$ is open, $F_1$ and $F_2$ being closed, and a second condition, wherein $O_1$ is closed $F_1$ and $F_2$ being then open.

While in operation, the carriage remains motionless as long as no loading or unloading of any object occurs. Loading is the operation which consists, at the entrance of the pathway (i.e. on the right extremity of the framework, FIGURE 1), in placing a load, for example a pallet on rails 1 and 2. Unloading is the operation which consists in removing the pallet at the exit end of the pathway (left extremity of the framework, FIGURE 1).

The electric circuit is designed so as to enable the carriage to carry out in a very simple manner the following elementary movements: forward motion, backward motion, stopping, upward and downward motion and a certain number of "programs" which combine, in a predetermined manner, said elementary movements.

Two programs will be respectively described below that are provoked by loading of an object and by its unloading, these programs being of particular practical importance.

The electric circuit, in its preferred embodiment and as it was described above, carries out both of these programs by going through two cycles of operation which involve a common part or "basic cycle" which will now be described.

This basic cycle begins while the carriage is moving backwards in the low position. At this moment, motor 21 is therefore rotating in the reverse direction, while motor 22 has stopped, the cams 40–43 being in the position shown in FIGURE 7. The different contacts occupy the positions shown in FIGURE 8.

In particular, contacts $P_2$, B, $T_2$ and R are closed, which enables feeding of motor 21 for reverse motion, through AR. When in the course of backward motion of the carriage, finder 13 encounters an obstacle (for example an object placed on the pathway), interlocked contacts $P_1P_2P_3$ are commuated, i.e. $P_1$ and $P_2$ open while $P_3$ closes.

Opening $R_2$ results in cutting off of AR and therefore in stopping of the motion of the carriage.

It results that contacts $A_1R_1$, $A_2R_2$ and $A_1V_1$, $A_2V_2$ will then close (these contacts being designed so that they are closed at rest. ($A_3R_3$ and $A_3V_3$ are normally open at rest.

Closing of $P_3$ then results in feeding of MC, and therefore in starting the operation of motor 22. At the end of half a turn in their rotation provoked by said motor, the cams have brought plate 23 into the high position, so that the object is loaded by the carriage. At this instant, contact $H_1$ is commutated.

Furthermore, during the upward movement of the plate, contacts $P_1$, $P_2$ and $P_3$ have again been commutated so that $P_3$ is again open while $P_1$ and $P_2$ are again closed. During the upward motion feeding of MC occurs from the time $P_3$ is opened through contact $M_1C_1$, which excitation of MC has closed.

Closing of $P_1$ provokes feeding of AV ($A_2R_2$ being then closed), so that motor 21 drives the carriage in the forward motion as soon as $H_1$ is closed, i.e. at the end of the upward stroke. Going into forward motion then cuts contact $A_1V_1$, and therefore MC.

When in the course of forward motion, finder 13 encounters an obstacle (for example an object placed on the pathway), contacts $P_1$, $P_2$ and $P_3$ are again commutated, i.e. $P_3$ closes and $P_1$ and $P_2$ open.

Opening of $P_1$ results in stopping the forward motion so that $A_1V_1$, $A_2V_2$ close. $A_3V_3$ again open. Closing of $P_3$ then results in starting motor 22 again, which provoke lowering of plate 23.

At the same time, contact $H_2$ being then closed (since the plate has just left the high position, closing of $H_2$ being slightly slowed down with respect to that of $H_1$) a current impulse is transmitted by $P_3$, $A_1R_1$, $A_1V_1$ and $H_2$ to the timing unit MI energizing coil. The timing unit is then started into operation for a time interval which may be taken to be, as a non-limiting example, equal to 6 sec. To this effect, contact $MI_2$ as well as $MI_1$ which are closed due to the operation of the timing unit insure its self energization.

Upon opening of $P_1$, unit 21 braking motor receives an order from AV for cessation of forward motion and, at the same time, the plate begins to move downwards. It results that the forward motion is progressively slowed down from the beginning of the downward motion of the plate up to the complete interruption of the forward motion, which coincides with the moment when the plate is stopped in the low position. The object is therefore smoothly deposited upon the pathway. Furthermore, taking into account the length of the finder, opening of $P_1$ was controlled when the forward part of the carriage was at a certain distance from the obstacle so that a predetermined space may be maintained between the objects that are successively placed upon the pathway.

When the plate reaches the low position, contact B closes. At this moment $P_2$ is open, but $MI_1$ is closed so that AR is fed and the carriage is driven into backward motion. It results that $A_1R_1$ opens, so that feeding of motor 22 is cut ($H_2$ being then open).

The whole apparatus is then in the same conditions as in the beginning of the basic cycle, and therefore if, in the course of its backward motion, the carriage encounters an object to be loaded a new basic cycle begins again.

It should be noted, however, that the conditions for provoking a new cycle are reached only at the end of the timing unit delay, i.e. when $MI_1$ and $MI_2$ are again opened. Prior to the end of this delay, the effect of the finder is cancelled out. This delay is preferably chosen so as to correspond to the travel time of the carriage along a distance equal to 1.5 times the length of a pallet. In this way, the chance of reloading the pallet which has just been deposited during the return movement of the carriage is completely eliminated.

This enables pallets of various lengths to be loaded and properly dealt with by the system. Besides, a pallet may be loaded at the entrance of a filled channel, without the risk of starting an oscillatory up and down motion of the plate. This results from the fact that the loading of the last pallet initiates, in a manner which will become clear hereinafter, the raising of the plate and the forward motion of the carriage. During its forward motion, the carriage almost immediately meets another pallet, which initiates the lowering of the plate and the return motion of the carriage. As the timing unit is operative during the whole return motion, which is comparatively short, the action of the finder when it meets the last pallet is cancelled and therefore, the carriage, once its return motion is ended, is completely stopped.

Referring back again to the discussion of the normal basic cycle, it is apparent that if the finder does not encounter any object during the backward motion of the carriage, the latter moves back until it engages with stop 19. At this moment, contact R opens and provokes the end of the operation. The carriage stays in a waiting position.

The program started by loading of an object takes place in the following manner:

Loading of an object retracts stop 19 (FIGURE 1), which provokes closing of contact R (FIGURE 8), and therefore the tripping of a basic cycle. It should be noted that the object needs not be placed at the entrance of the pathway in a precise position: the backward motion being released, the finder comes to rest against the object and the carriage then loads the latter in its effective position, even if setting into place involves a certain inaccuracy. The accuracy required is that which is obtained with current loading devices, and it may be adjusted as a function of the loading device used.

The program set into motion by unloading of an object takes place in the following manner:

Unloading of an object results in releasing, in a way not illustrated in the drawing, contact unit 17 (FIGURE 1), which has the effect of connecting wires 68 and 50 together. The case where this occurs at a time when the apparatus is at rest, will first be considered. The carriage is then in a waiting position and $P_2$ and B are closed.

Auxiliary contacts of coil F of bi-stable unit FO, namely $F_1$ and $F_2$, are closed. It results that the carriage may be put into forward motion due to the action of contact 17 which connects lead 68 to the phase "—" and as B is closed, has the effect of energizing contactor T, which in turn closes contact $T_1$ and contact $T_3$ (which self-feeds contactor T), while it opens contact $T_2$. It results that AR cannot be fed, even if an object is placed upon the plate. There is therefore a priority of the putting away program over the loading program.

The forward motion is controlled by $T_1$, independently from any action which might eventually be exercised on the finder.

The carriage thus called into low position, is driven forward until it reaches stop 16, while passing under the objects, if any, which are arranged along the pathway. When it reaches stop 16, contacts $A_1$, $A_2$ which are normally open, close momentarily, which results ($A_3V_3$ being closed) in the energization of coil O, and therefore in the opening of contact $F_1$ and $F_2$ and closing of contact $O_1$. It results, $F_2$ being open, that contactor T is deenergized, so that contact $T_1$ opens.

Opening of $T_1$ cuts forward motion, while closing of $T_2$ makes it possible to feed AR. The carriage is then put into backward motion (with the timing unit disabled)

and, $T_1$ being open, the finder is again capable of producing its normal effect. If the finder encounters an object in the course of its backward motion (which is the most common case), a basic cycle will take place. This basic cycle, however, will be distinguished from that which has been described previously in that the forward motion of the loaded carriage will no longer be stopped by encounter with an object by the finder before element 14 comes into contact with stop 16; then A, and $A_2$ close, and will remain closed, due to the action of stop 16, until the carriage again starts its backward motion. The auxiliary contacts of coils O and F are in the condition which corresponds to the energization of coil O. The contact of the finder with the forward end part of the pathway (not visible in the drawing) or any other equivalent stop (not shown) located at the forward extremity of the pathway which will provoke the commutation of contacts $P_1P_2P_3$. This initiates, as discussed hereinabove, the forward motion of the carriage and $A_3R_3$ closes. $T_4$ B and $A_2$ being closed, coil F is energized and therefore, the whole circuit has come back in the initial conditions for starting the basic cycle.

Finally, the basic cycle will occur as many times as the finder encounters an object during its backward motion so that these different objects will be accumulated at the forward part of the pthaway until, no object whatsoever being any longer encountered during backward motion, the carriage stops in the waiting position at the entrance of the pathway.

In the case where release of contact 17 intervenes during the execution of a program while the plate is not in the low position, contact B being then open, contactor T cannot be fed and therefore, the forward call of the carriage cannot be started before the end of the current program and the return of the plate to the low position. It results, in particular, that a putting away operation in the course of execution is interrupted by unloading of an object at the exit of the pathway only when the object that is being put away has been set into place. At that moment, the device no longer attends to putting away the objects located upstream, and goes back to the beginning of the putting away program, i.e. it begins by filling the void created at the exit of the pathway by the object that was unloaded.

Now, the operation of contact $R_2$ will be explained by consideration of the case when the carriage is removed of a first void channel and placed in a second partially filled up channel.

The contact $R_2$, normally open is, as explained hereinabove, closed by the passage of the carriage through the exit of the first channel, when the carriage is removed. It results that, during the removal, coil F will be energized through wire 68 and closed contact $R_2$ and therefore, $O_1$ will open and $F_1F_2$ close. Such a condition of the contacts $O_1$, $F_1$ and $F_2$ normally is present, as explained hereinabove, when the carriage is in a waiting position at the entrance of a channel, and it is necessary for enabling the carriage to be started in forward motion towards the exit of the channel when a pallet is unloaded. However, in the specific case presently considered, when the last pallet is being unloaded from the first channel, at the time when the carriage is returning back to the entrance of the said channel, which is then void, the finder meets with no pallet at all and, therefore, coil O remains in the energized condition, whereas F is not energized. It would result in the absence of the energization of coil R through contact $R_2$ that the carriage, once placed at the entrance of the second channel, could no longer be started in forward motion when a pallet would be unloaded.

Referring to FIGURES 9 and 10, a preferred embodiment of the finder 13 (FIGURES 4 and 5), will now be described. The latter consists of a flat arched iron 51 on which pallet O (FIGURE 9), resting on the upper surface 52 of the pathway, comes to bear in a progressive manner, so as to provoke its withdrawal below plane 52. A lever, 53, hinged along a fixed axis 54 linked to the framework of the carriage and fixed, in a manner that may be regulated, to a block 55 that is integral with the lower face of flat iron 51, bears a block 56 (FIGURE 9), to which is attached one end of a return spring, the other extremity of which 58 is attached to a fixed point 59 of the carriage framework.

Block 56 supports an axis 60 on which is hinged an arm 61 (FIGURES 9 and 10). At its other extremity, this arm is hinged by means of an axis 62, to a bent lever consisting of two portions 63a and 63b and capable of oscillating around a horizontal axis 64. This oscillation is braked by friction washers 65 (FIGURE 10).

Portion 63b comes to bear in control member 66 of a contactor 67, which consists of the three contacts $P_1P_2P_3$ mentioned above. When this bearing action ceases, control member 66 turns to its initial position under the influence of the usual release spring with which the contactor is provided.

The finder thus constituted functions as follows:

When the flat iron 51 begins to engage below a pallet and to withdraw, lever 63a–63b oscillates in the direction of the arrow (FIG. 9) and pushes member 66 towards the left. When this member has carried out a predetermined stroke, a first commutation of the contractor occurs. Flat iron 51 continues to move downwards more or less in proportion to the amount of flexion of the pallet bottom plate, but, from this moment on, due to the resistance opposed by member 66, the friction washers stop interlocking between each other both portions 63a and 63b of the bent lever.

As soon as the flat iron 51 begins to move upwards again as a result of the upward motion of the plate and of the pallet that it bears, the bent lever begins to be drawn back to its initial position under the action of spring 57. As soon as this return has allowed member 66 to effect a predetermined inverted stroke, a new commutation of the contactor occurs in the reverse direction from the preceding one. In order for this second commutation of the contactor to occur, the upward motion of the plate simply needs to be at least equal to said predetermined inverted stroke, which is relatively small (for example 3 mm.).

This feature of the invention therefore, makes it possible to require a small upward motion of the plate (for example 1 cm.), which reduces the time required for upward motion and simplifies control.

In the absence of this differential transmission of the movement of the flat iron to member 66, the second commutation of the contactor would occur at the end of an inverted stroke equal to the sum of said predetermined inverted stroke and of the excess stroke carried out in the forward direction beyond the position occupied by member 66 at the time of the first commutation. However this latter forward excess, stroke would vary in the same proportions as the amount of flexion of the pallet bottom plate, and could thus reach for example 2 cm. so that the upward motion of the plate would have to go appreciably beyond this value in order for a second commutation to actually take place.

In applications in which the installation could have to perform the complete and quick unloading of a channel, the electric circuit will include an additional switch (not illustrated) controlled by an additional detector unit mounnted on the framework, at the exit end of the channel.

When a pallet reaches the exit end of the channel, it then operates the additional switch, which cuts out the supply of the electric circuit, resulting in stopping the carriage at the exit end of the channel. The carriage is thus no longer capable of effecting the operation of rearranging the pallets. Such time-consuming an operation is, in fact, useless in the case presently considered: when the pallet is unloaded, the additional detector unit is released and therefore, the supply of the electric circuit is established again: the carriage will then proceed as usual and bring a second pallet at the exit end of the channel, and so on until the last pallet is unloaded. The additional switch may be in turn disabled by a further switch which will provide for the permanent supply of the electric control circuit and, therefore, for the normal operation of the installation.

What is claimed is:

1. A system for automatic transfer of loads along a horizontal pathway, of the type in which the loads are successively displaced one by one from the entrance of the pathway toward its exit and, the first load introduced at the entrance having been removed at the exit, there occurs a shift in the direction of the exit of all the loads carried by the pathway, said system comprising a carriage adapted for alternately moving in one direction and in the other along the pathway, said carriage having a plate adapted for taking in the forward direction of the carriage, a raised position in which it transports the loads, said system further comprising an electric circuit including contacts that are controlled by different detector means, placed on the carriage and on the pathway and adapted for collecting binary information relative to ends of forward, high low and backward strokes of the carriage upon encounter with a load by the carriage on the pathway and upon unloading of an object and motor means controlled by said electric circuit and capable of releasing, as a function of said information, the forward or return motion of the carriage or its stopping in a definite position and the upward or downward motion or stopping in a high or low position of the plate, wherein the detector means include a finder placed at the front of the carriage and the electric circuit includes at least three contacts, adapted for cooperation with the finder and control of the horizontal motion of the carriage and the vertical motion of the plate, a first switching of said three contacts taking place at the time, when a load is present on the pathway at a predetermined distance from the front of the carriage, whereas another switching takes place when the finder is released, the electric control circuit further comprising means for controlling the forward motion of the carriage independently of the action of the said three contacts, each time an object is unloaded at the exit of the pathway when the carriage is stopped with its plate lowered.

2. A system as claimed in claim 1, wherein the carriage is removable and adapted to serve a plurality of distinct pathways, said electric circuit including a further contact which is switched on each time the carriage is removed from one pathway and a further supply circuit for said means for controlling the forward motion of the carriage, the said further supply circuit being established each time the further contact is switched on.

3. A system as claimed in claim 1, wherein the electric circuit includes timing means adapted for cancelling the action of the said three contacts for a predetermined time interval, when the return movement of the carriage that has first deposited an object occurs.

4. A system as claimed in claim 1, wherein there is provided detector means for detecting the presence of an object at the entrance of the pathway and a contact, switched by the action of the said detectors means, and adapted for initiating the return motion of the carriage, with the plate in a low position, until the finder meets an object and the said three contacts are switched, thus stopping the said return motion and initiating the raising of the plate.

5. A system as claimed in claim 1, wherein the motor means for raising and lowering the plate include cams cooperating with the said plate and a braking motor for driving said cams.

6. A system as claimed in claim 1, wherein the finder controls the switching of the said three contacts through transmission means which, upon depression of the finder, are disengaged as soon as the finder stroke has been sufficient to provoke the said switching.

References Cited

UNITED STATES PATENTS 2,647,647   8/1953   Alimanestiano.
3,079,015   2/1963   Sinclair et al.

RAYMOND B. JOHNSON, Assistant Examiner

GERALD M. FORLENZA, Primary Examiner